(12) United States Patent
Chen et al.

(10) Patent No.: US 10,120,555 B2
(45) Date of Patent: Nov. 6, 2018

(54) CURSOR POSITIONING ON DISPLAY SCREEN

(71) Applicant: International Business Machines Corporation, Armonk, NY (US)

(72) Inventors: Li Jia Chen, Beijing (CN); Yu Chen, Beijing (CN); Qiuju Geng, Beijing (CN); Kun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 14/713,056

(22) Filed: May 15, 2015

(65) Prior Publication Data

US 2016/0334962 A1   Nov. 17, 2016

(51) Int. Cl.
*G06F 3/0485*   (2013.01)
*G06F 3/0484*   (2013.01)
*G06F 3/0488*   (2013.01)

(52) U.S. Cl.
CPC ........ *G06F 3/0485* (2013.01); *G06F 3/04842* (2013.01); *G06F 3/04883* (2013.01); *G06F 2203/04808* (2013.01)

(58) Field of Classification Search
USPC ................ 715/784; 345/157, 156, 173, 660; 455/566
See application file for complete search history.

(56) References Cited

U.S. PATENT DOCUMENTS 7,159,172 B1 *   1/2007   Bentley .................... G06F 3/14
                                                                    345/156
8,698,773 B2     4/2014   Westerman et al.
2002/0057256 A1 *   5/2002   Flack ........................... 345/157
2002/0084981 A1 *   7/2002   Flack ................... G06F 3/04812
                                                                    345/157
2007/0202914 A1 *   8/2007   Maaloe ................. G06F 1/1616
                                                                    455/550.1
2009/0002326 A1     1/2009   Pihlaja
2009/0288043 A1     11/2009   Willis
2011/0239153 A1     9/2011   Carter et al.
                            (Continued)

FOREIGN PATENT DOCUMENTS

CN    103076982 A    5/2013
CN    103135901 A    6/2013

OTHER PUBLICATIONS

"New Android User: Accurate cursor positioning", Jun. 28, 2011, 3 pages, <http://newandroiduser.blogspot.in/2011/06/accurate-cursor-positioning.html>.

*Primary Examiner* — Doon Chow
*Assistant Examiner* — Wendy Nicholas
(74) *Attorney, Agent, or Firm* — David B. Woycechowsky; Andrew Aubert

(57) ABSTRACT

A user interface for a touchscreen display device including a technique for cursor positioning, with respect to: (i) a touchscreen display upon which the cursor is displayed; and (ii) displayable content (also sometimes herein referred to as a "display area") which is also, at least in part, displayed on the touchscreen display. Based on a desired position to which the activated display area is moved while a cursor remains static on the display screen, a placement position at which the cursor is to be placed with respect to the displayable content is determined.

12 Claims, 11 Drawing Sheets

(56) References Cited

U.S. PATENT DOCUMENTS

| | | | |
|---|---|---|---|
| 2012/0249595 A1* | 10/2012 | Feinstein | G06F 1/1694 |
| | | | 345/642 |
| 2013/0002719 A1* | 1/2013 | Ide | 345/660 |
| 2013/0113720 A1* | 5/2013 | Van Eerd | 345/173 |
| 2014/0035825 A1 | 2/2014 | Zhang et al. | |

* cited by examiner

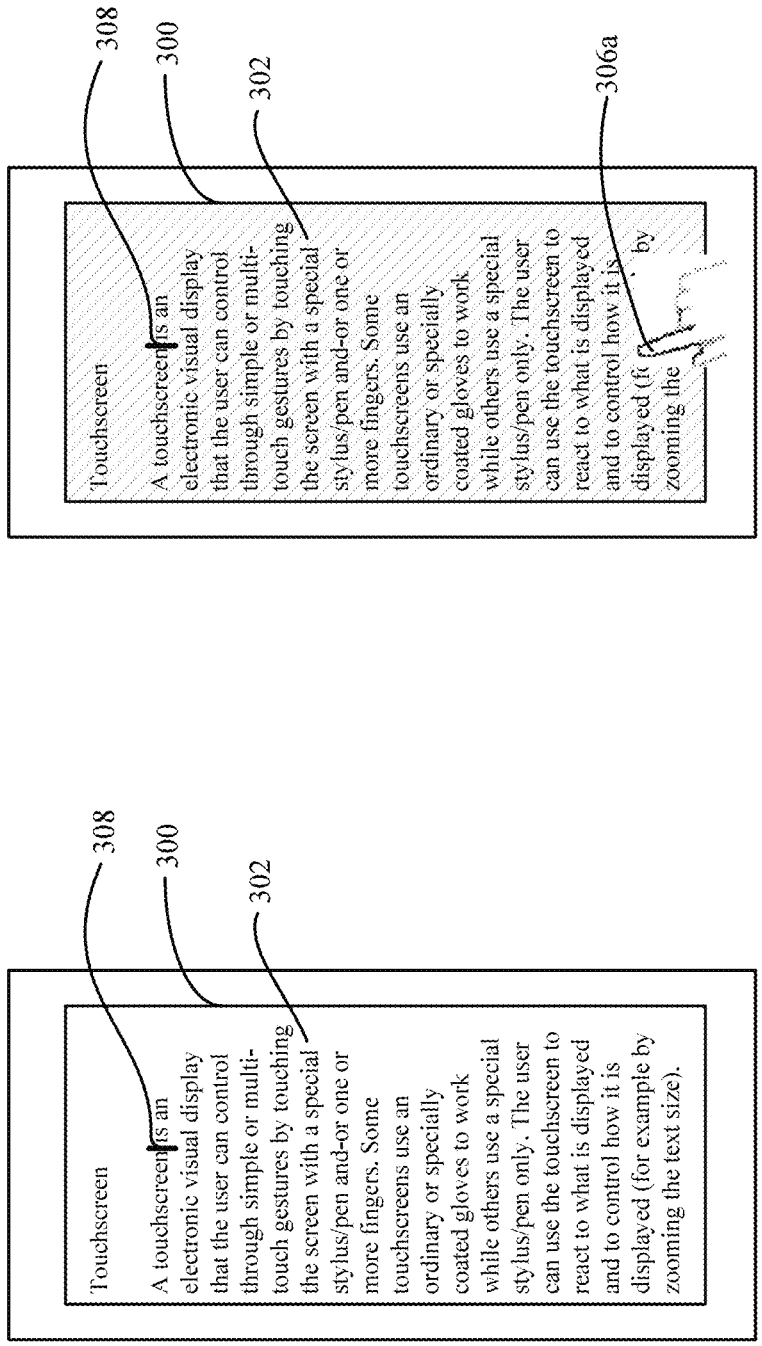

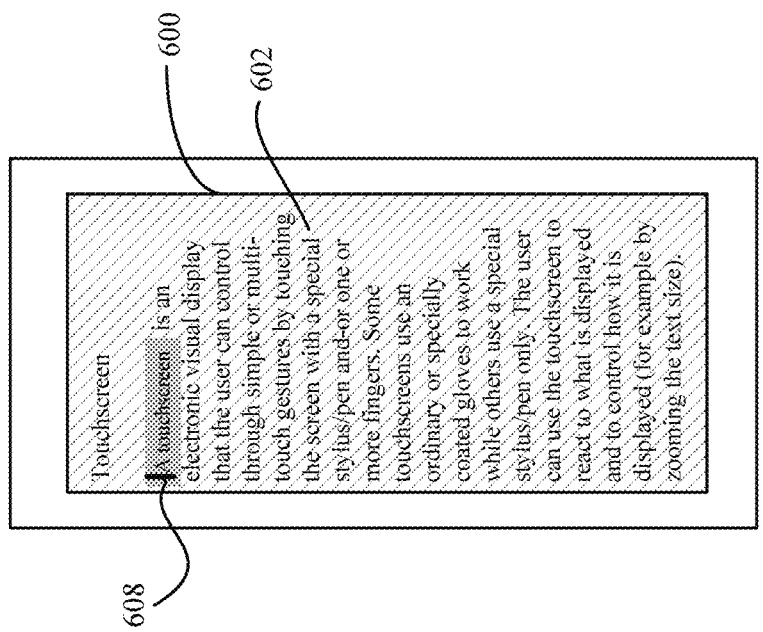
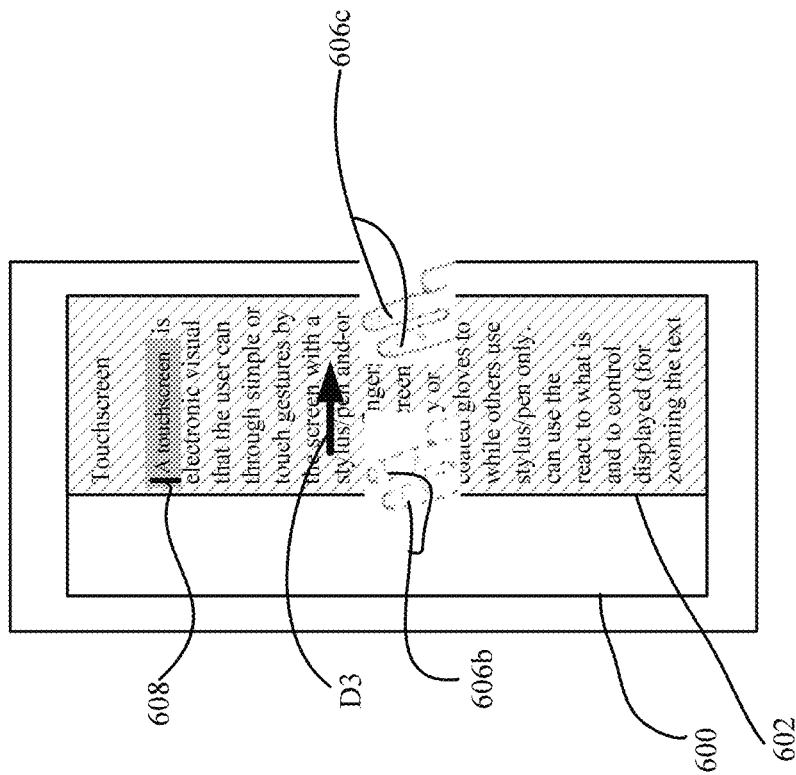
Fig. 6C
Fig. 6D

CURSOR POSITIONING ON DISPLAY SCREEN

BACKGROUND

The present invention relates to cursor positioning technique, and more specifically, to a computer-implemented method for cursor positioning on a display screen and apparatus thereof.

Portable electronic devices such as mobile phone, smart phone, Personal Digital Assistant (PDA), tablet, etc. have been an important tool for modern people. Particularly, the portable electronic device can provide a large amount of mobile applications. Some applications can allow a user of the portable electronic device to edit data such as text, images, etc. (herein referred to as "displayable content") on a display area, such as a touchscreen display, or a portion of a touchscreen display (for example, a window displayed on a touchscreen display). This editing of data of the displayable content may include, for example, adding data, deleting data, or selecting data. Typically, the user interface for editing displayable content includes implementing cursor positioning in a display on the display screen along with at least a portion of the displayable content. The position of the cursor typically determines the location within the displayable content at which data is to be edited.

Currently, the portable electronic device is often provided with a touch display screen. The user of the portable electronic device can touch, with his/her finger or a stylus, icons or function keys displayed on the touch display screen to perform an operation.

In the process of data editing, if the user intends to move a cursor to a desired position, usually the user can touch the desired position on the touchscreen display with his/her finger, and, upon detection and determination of the finger's touching position, the cursor will be moved, relative to the touchscreen display, to the touching position.

SUMMARY

According to an aspect of the present invention, there is a method, computer program product and/or system that performs the following operations (not necessarily in the following order): (i) displaying a first display on a touchscreen display, with the first display including: a cursor, with the cursor being located at a first cursor location relative to the touchscreen display, and at least a portion of a displayable content, with the displayable content being located at a first displayable content location relative to the touchscreen display; (ii) receiving gesture type user input through the display screen; (iii) during the receipt of gesture type user input, displaying a plurality of intermediate displays on the touchscreen display, with each intermediate display including: the cursor, with the cursor being located at the first cursor location relative to the display screen, and at least a portion of the displayable content, with the displayable content being moved in location, relative to the touchscreen display, in successive intermediate displays of the plurality of intermediate displays in a manner corresponding to the gesture type input being received; (iv) responsive to a completion of the receipt of the gesture type user input, displaying a second display on the touchscreen display, with the second display including: the cursor, with the cursor being located at the first cursor location relative to the touchscreen display, and at least a portion of the displayable content, with the displayable content being located at a second displayable content location relative to the touchscreen display, so that the first cursor location and the second displayable content location define a user-selected relative positioning as between the cursor and the displayable content; and (v) responsive to the display of the second display, displaying a third display on the touchscreen display, with the third display including: the cursor, with the cursor being located at a second cursor location relative to the touchscreen display, and at least a portion of the displayable content, with the displayable content being located at the first displayable content location relative to the touchscreen display, with the second cursor location being determined so that the relative positioning as between the cursor and the displayable content, in the third display, is the user-selected relative positioning.

BRIEF DESCRIPTION OF THE DRAWINGS

FIG. 3A is a view of a display screen at a first point in time, illustrating an example of the cursor positioning in which the method shown in FIG. 2A is implemented;

FIG. 3B is a view of a display screen at a second point in time, illustrating an example of the cursor positioning in which the method shown in FIG. 2A is implemented;

FIG. 6C is a view of a display screen at a third point in time, illustrating an example of the cursor positioning in which the method of FIG. 5 is implemented;

FIG. 6D is a view of a display screen at a fourth point in time, illustrating an example of the cursor positioning in which the method of FIG. 5 is implemented;

DETAILED DESCRIPTION

However, the existing portable electronic device often has a small size display screen, and accordingly the word is not big under a normal display mode. As touching area of the finger with the display screen may be larger than a word, it might happen that the cursor is moved to the different position from the desired position, and thus it is difficult to position the cursor precisely. A similar problem may occur in the text selection process.

According to an embodiment of the present invention, there is provided a computer-implemented method for cursor positioning on a display screen. Responsive to enablement of cursor positioning, a display area (sometimes also herein referred to as "displayable content") on the display screen is activated. Based on a desired position to which the activated display area is moved while a cursor remains static on the display screen, a placement position at which the cursor is to be placed on the display area is determined.

According to another embodiment of the present invention, there is provided an apparatus for cursor positioning on a display screen. The apparatus comprises one or more processors, a memory coupled to at least one of the processors, and a set of computer program instructions stored in the memory and executed by at least one of the processors in order to perform actions of, responsive to enablement of cursor positioning, activating a display area on the display screen, and determining a placement position at which a cursor is to be placed on the display area based on a desired position to which the activated display area is moved while the cursor remains static on the display screen.

According to still another embodiment of the present invention, there is provided a computer program product for cursor positioning on a display screen. The computer program product comprises a computer readable storage medium having program instructions embodied therewith. The program instructions are executable by a processor to cause the processor to, responsive to enablement of cursor positioning, activate a display area on the display screen, and determine a placement position at which a cursor is to be placed on the display area based on a desired position to which the activated display area is moved while the cursor remains static on the display screen.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
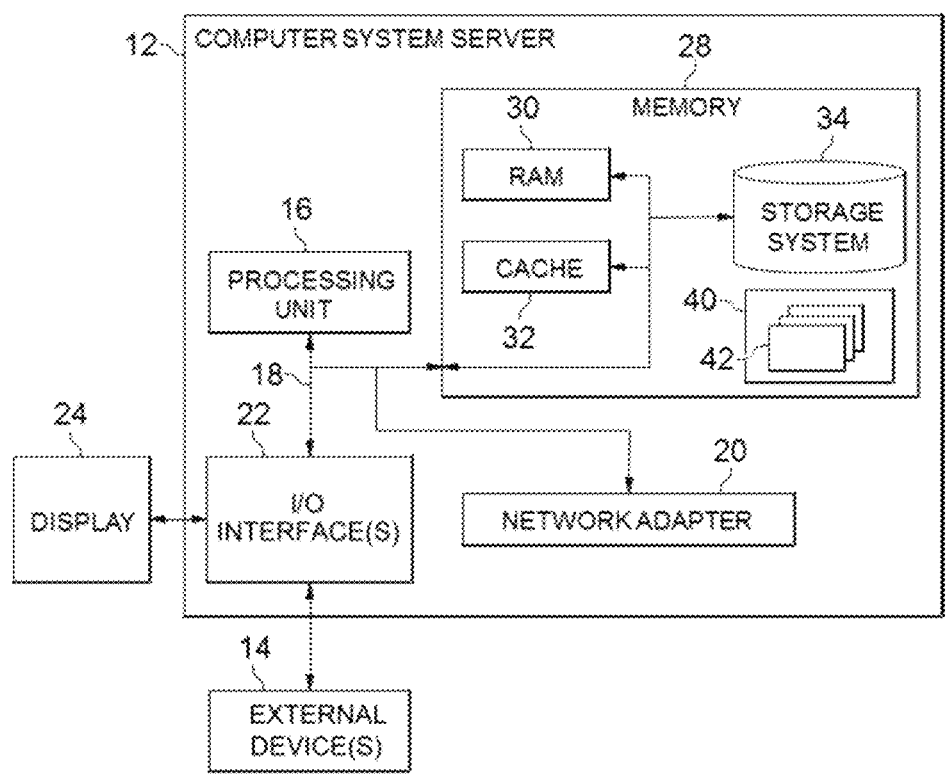
FIG. 1 shows an computer system which is applicable to implement the embodiments of the present invention.

Referring now to FIG. 1, in which a computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figures 2A, 2B:
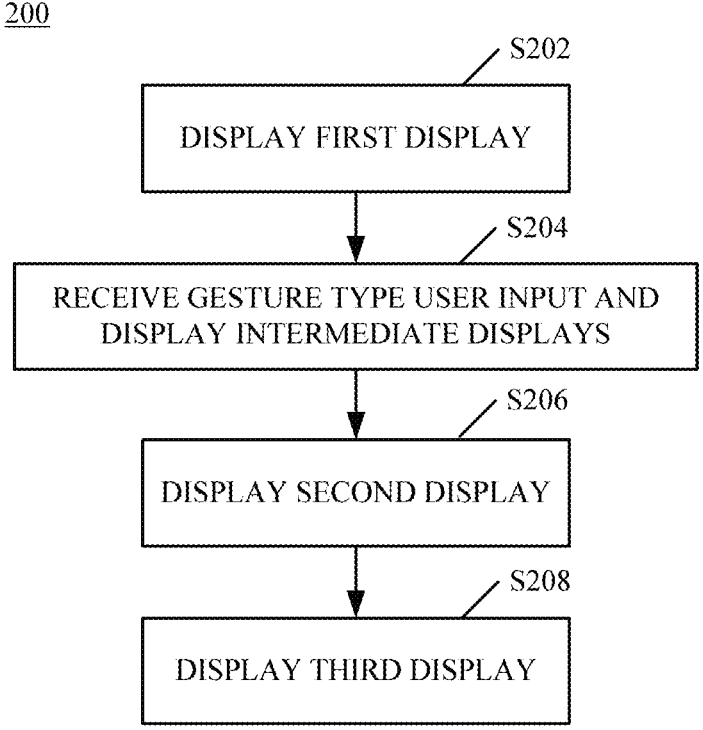
FIG. 2A is a schematic flowchart of the method for cursor positioning on a display screen according to an embodiment of the present invention.
FIG. 2B is a block diagram of a computer readable storage medium with machine logic (for example, software) for performing the method of FIG. 2A.

With reference now to FIG. 2A, it shows a schematic flowchart of a method for cursor positioning on a display screen according to an embodiment of the present invention. This embodiment will be described in detail below in conjunction with the figures.

The main idea of the method of the embodiment is to move the display area on the display screen under the control of a user, rather than moving the cursor, and determine the final placement position of the cursor based on the moving of the display area, thereby implementing the cursor positioning.

In this embodiment, the display screen can be a touch display screen of any portable electronic device, for example, mobile phone, smart phone, PDA, laptop, tablet, and the like, or can be formed by a projector's projection on a desk or wall. The display area can be an editable area displaying data, such as texts, images, etc., on the display screen.

In this embodiment, the display area can be whole or a part of the display screen, and can be in the form of text box, such as a single-line text box or a multi-line text box.

As shown in FIG. 2A, at step S202, first program instructions 252 of computer readable storage medium 250 (see FIG. 2B) display a first display on a touchscreen display. The first display includes: (i) a cursor, with the cursor being located at a first cursor location relative to the touchscreen display, and (ii) at least a portion of a displayable content (also sometimes herein referred to as a "display area"), with the displayable content being located at a first displayable content location relative to the touchscreen display. An example of such a "first display" is shown in FIG. 3A, as will be discussed, below.

Processing proceeds to step S204 where two simultaneous operations are performed as will be discussed in the following two paragraphs.

In one of the simultaneous operations, second program instructions 254 (see FIG. 2B) receive gesture type user input through the display screen. An example of such "gesture type user input" is shown in FIGS. 3B and 3C, as will be discussed, below.

In the other simultaneous operation, during the receipt of gesture type user input, third program instructions 256 (see FIG. 2B) display a series of intermediate displays on the touchscreen display. Each intermediate display includes: (i) the cursor, with the cursor being located at the first cursor location relative to the display screen, and (ii) at least a portion of the displayable content. The displayable content is moved in location, relative to the touchscreen display, in successive intermediate displays of the series of intermediate displays in a manner corresponding to the gesture type input being received. An example of this is shown in FIGS. 3B and 3C, as will be discussed, below.

Processing proceeds to step S206, where fourth program instructions 258 (see FIG. 2B), responsive to a completion of the receipt of the gesture type user input, display a second display on the touchscreen display. The second display includes: (i) the cursor, with the cursor being located at the first cursor location relative to the touchscreen display, and (ii) at least a portion of the displayable content, with the displayable content being located at a second displayable content location relative to the touchscreen display. The first cursor location and the second displayable content location define a user-selected relative positioning as between the cursor and the displayable content. An example of this is shown in FIG. 3C, which will be discussed, below.

Processing proceeds to step S208, where fifth program instructions 260, responsive to the display of the second display, display a third display on the touchscreen display. The third display includes: (i) the cursor, with the cursor being located at a second cursor location relative to the touchscreen display, and (ii) at least a portion of the displayable content. The displayable content being located at the first displayable content location relative to the touchscreen display (compare text positioning on the display screen in FIGS. 3A and 3D). The second cursor location is determined so that the relative positioning as between the cursor and the displayable content, in the third display, is the user-selected relative positioning. That is, the relative position of the cursor to the text is the same in FIG. 3C as it is in FIG. 3D.

In some embodiments, the enablement of the cursor positioning can be triggered by any predefined operation, such as a tactile operation. The tactile operation can be any predefined operation or gesture touching the display area.

In some embodiments, the tactile operation can be, for example, an operation of touching the display area with single touch for a predetermined time period. The single touch means touching any single point on the display area. In this case, if it is detected that the user touches any single point on the display area with a single finger or stylus for the predetermined time period, the cursor positioning is enabled. The display area enters a cursor positioning mode.

Upon activation of the original display area is activated, the activated display area is formed. The activated display area is the same as the original display area in terms of size and content, and can be moved in any direction under the control of the user. Note that, in case of the single-line text box, the activated display area can be moved only in a horizontal direction (that is, left-right direction).

In an embodiment, firstly a floating display area the same as the original display is generated as the activated display area. Then the floating display area is presented above the original display area. The floating display area can be presented, for example, with a different color, to distinguish from the original display area.

A person skilled in the art will appreciate that the display area can be activated in other ways, as long as the activated display area can be moved.

In some embodiments, based on a desired position to which the activated display area is moved, a placement position at which the cursor is to be placed on the original display area is determined. During the movement of the activated display area, the cursor remains static on the display screen, that is, the position of the cursor on the display screen is unchanged. As described above, the activated display area would be moved under the control of the user and the final placement position for the cursor can be determined based on the moving.

In an embodiment, a drag operation on the activated display area is received firstly. During the drag operation, the user can use his/her finger(s) or stylus to touch any part of the activated display area and move on the display screen, then the activated display area will be moved following the movement of the user's finger. When the user's finger stops moving, the movement of the activated display area will be stopped. The cursor is not moved actually during the movement of the activated display area. With the drag operation, the activated display area is moved relative to the cursor, which causes the cursor's position on the activated display area to change.

Further, the data near the cursor can be enlarged in the activated display area, in order for the user to see the cursor's position on the activated display area to match the desired position precisely. The range for the enlargement can be predefined. With the movement of the activated display area, the enlarged data will change.

Upon the stop of the drag operation on the activated display area, the position of the cursor currently on the activated display area is determined as a temporary position. The temporary position indicates the desired position by the user at which the cursor is to be finally placed. At this time, the cursor's position on the original display area does not change.

Generally, when the activated display area is not moved for a predetermined time period, it is determined that the drag operation stops.

Then a position corresponding to the temporary position on the original display area, according to one embodiment of the present invention, is determined as the placement position for the cursor. Generally, a position can be represented by coordinate value. In this case, the same coordinate system is used for the original display area and the activated display area, i.e. the same origin and scale. Upon the determination of the temporary position, the coordinate value of the temporary position can be obtained. Thus the position on the original display area having the same coordinate value as the temporary position is determined as the placement position for the cursor.

In another embodiment, the drag operation on the activated display area is received firstly. As described above, with the drag operation, the activated display area is moved relative to the cursor, to cause the cursor's position on the activated display area to change.

When the drag operation for the activated display area is stopped, a move direction and move distance of the activated display area can be determined. The determination of the move direction and move distance can be implemented by tracking the movement of the activated display area, which is known for a person skilled in the art.

Based on the determined move direction and move distance, the placement position for the cursor can be determined. Specifically, an initial position of the cursor on the original display area can be determined. Then the initial position is shifted by the move distance in the direction opposite to the move direction, and the obtained position is the placement position for the cursor.

When the user's finger(s) or the stylus leaves from the activated display area, the movement of the activated display area is released. In response to the release, the activated display area is deactivated. In some embodiments, the deactivation for the activated display area means releasing the activated display area. In this way, the activated display area does not exist any longer. Then the cursor is placed at the placement position determined to have the same relative positioning with respect to the display area, as when the user completed the drag operation and the floating display area stopped moving. In this way, the cursor is moved from the initial position to the placement position on the original display area.

It can be seen from the above description that the method for cursor positioning on the touch display screen of the embodiment can implement the cursor positioning by moving the display area rather than the cursor, and have advantages of placing the cursor precisely, facilitating the user's operation, and improving preciseness and efficiency of the cursor positioning.

FIGS. 3A to 3D collectively include: touchscreen display 300; displayable content 302 (also sometimes herein referred to as "display area"); user gesture drag positions 306a, b, c; cursor 308; and dragging direction D1.

Figure 3D:
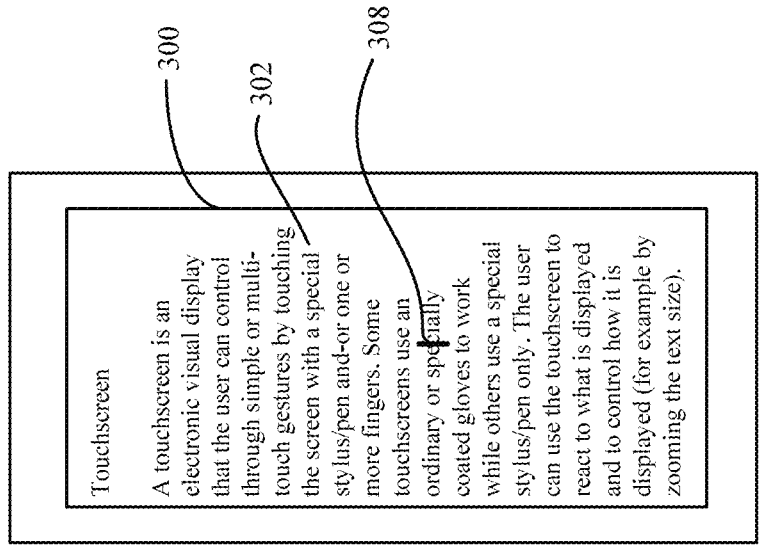
FIG. 3D is a view of a display screen at a fourth point in time, illustrating an example of the cursor positioning in which the method shown in FIG. 2A is implemented.
Figure 3C:
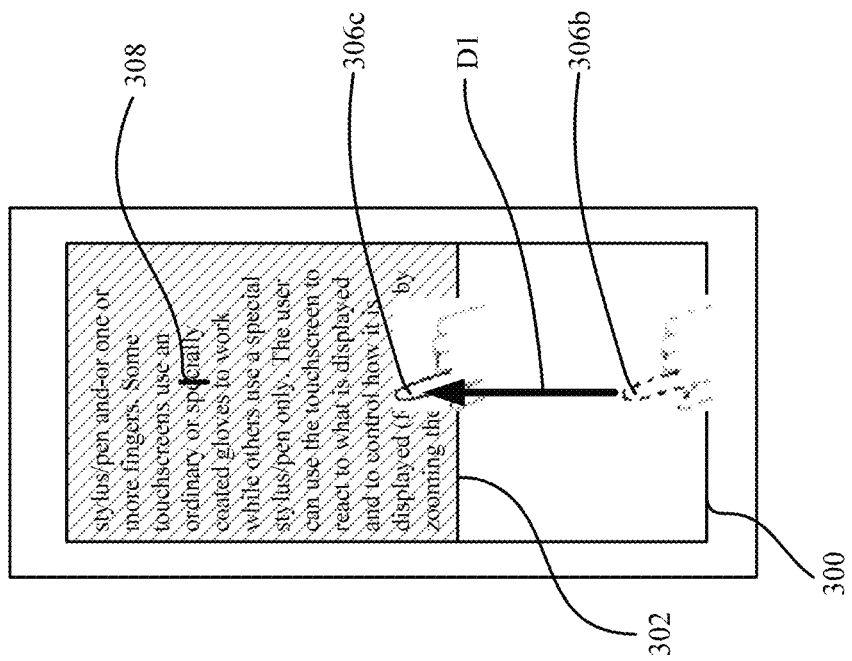
FIG. 3C is a view of a display screen at a third point in time, illustrating an example of the cursor positioning in which the method shown in FIG. 2A is implemented.

FIGS. 3A to 3D illustrates an example of the cursor positioning in which the method shown in FIG. 2A is implemented. FIG. 3A shows the touchscreen display 300 before the cursor positioning, FIG. 3B shows the touchscreen display after activating the display area, FIG. 3C shows the touchscreen display when moving the activated display area, and FIG. 3D shows the touchscreen display after the cursor positioning.

In this example, the display area is the whole touchscreen display 300. FIG. 3A shows the initial position 308 of the cursor on the original display area, i.e. after the word "touchscreen". The user wants the cursor to be placed between the letters "e" and "c" of the word "specially". Firstly, the user performs the tactile operation for enabling cursor positioning. In this example, the user touches the original display area 302 with his/her finger for 3 seconds, for example, to enable the cursor positioning. Then the original display area is activated. As shown in FIG. 3B, the floating display area 302 with a different color, as the activated display area, is presented on the touch display screen, and the text "en", " i" near the cursor is enlarged. The user moves the floating display area upward in the vertical direction D1 of FIG. 3C (i.e. up-down direction), to make the cursor's position 308 on the floating display area change. When the user finds that the cursor's position is between the letters "e" and "c" of the word "specially" in the floating display area 302, he/she stops moving the floating display area, as shown in FIG. 3C. Such position is determined as the final placement position 308 for the cursor. When the user's finger leaves from the touchscreen display 300, the floating display area 302 is released, and the cursor 308 is placed between the letters "e" and "c" of the word "specially" in the original display area 302, as shown in FIG. 3D.

FIGS. 4A to 4D collectively include: touchscreen display 400; displayable content 402 (also sometimes herein referred to as "display area"); user gesture drag positions 406a, b, c; cursor 408; and dragging direction D2.

Figure 4B:
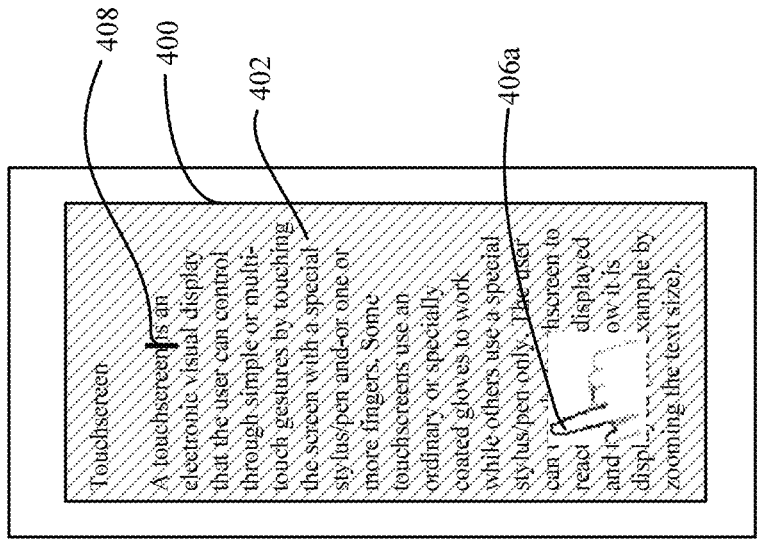
FIG. 4B is a view of a display screen at a second point in time, illustrating an example of the cursor positioning according to the present disclosure.
Figure 4A:
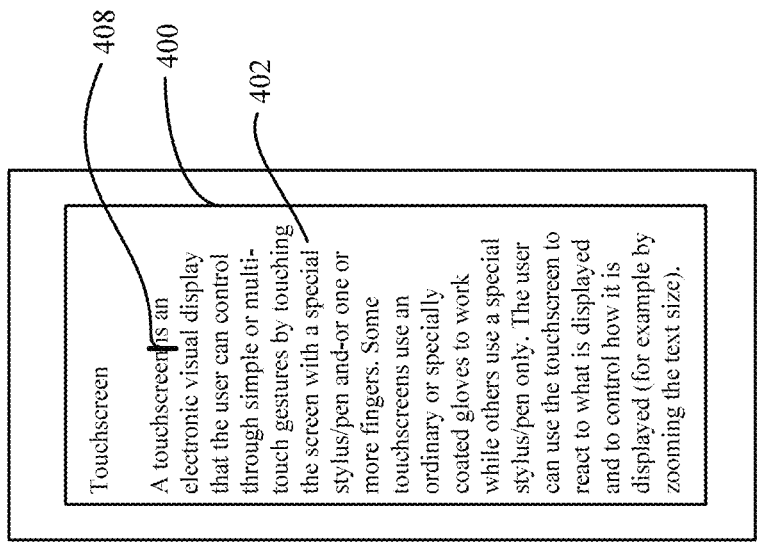
FIG. 4A is a view of a display screen at a first point in time, illustrating an example of the cursor positioning according to the present disclosure.
Figure 4D:
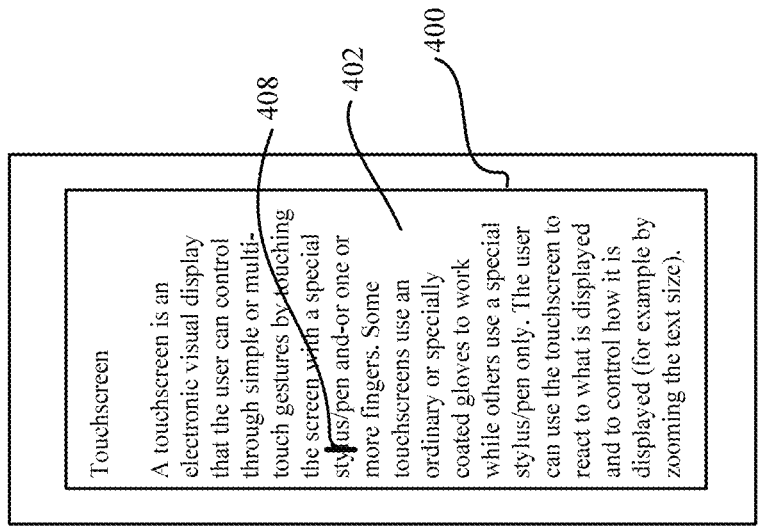
FIG. 4D is a view of a display screen at a fourth point in time, illustrating an example of the cursor positioning according to the present disclosure.
Figure 4C:
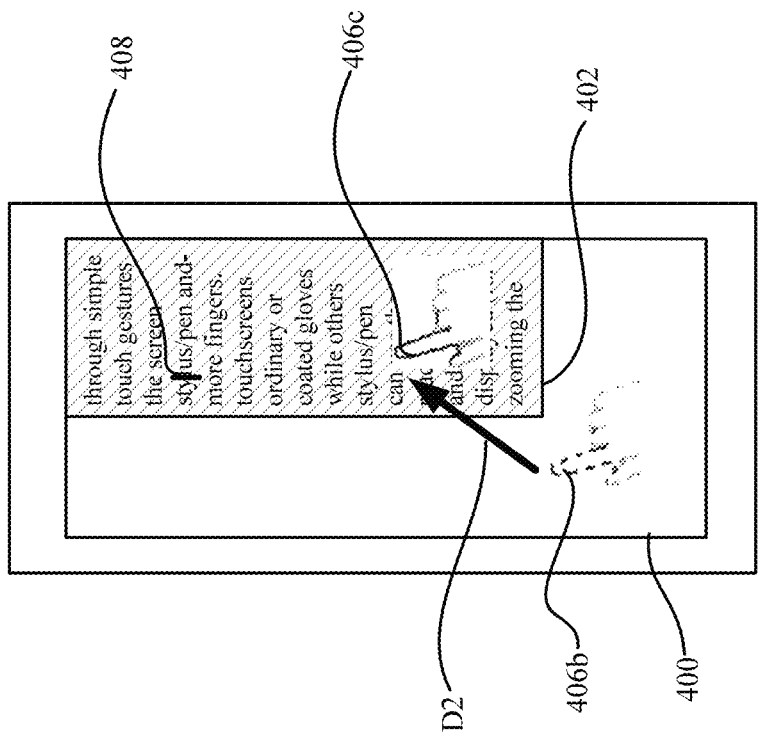
FIG. 4C is a view of a display screen at a third point in time, illustrating an example of the cursor positioning according to the present disclosure.

FIGS. 4A to 4D illustrate another example of the cursor positioning in which the method shown in FIG. 2 is implemented. In this example, FIGS. 4A and 4B are similar to FIGS. 3A and 3B. In FIG. 4C, the user moves the floating display area 402 in the upper right direction D2, and stops moving the floating display area when the cursor's position is between the letters "y" and "l" of the word "stylus" in the floating display area. This position is determined as the final placement position for the cursor. When the user's finger leaves from the touchscreen display 400, the floating display area is released, and the cursor 408 is placed between the letters "y" and "l" of the word "stylus" in the original display area, as shown in FIG. 4D.

Although the examples in which the floating display area is moved in the vertical direction and in the upper right direction respectively are described above, a person skilled will appreciate that the floating display area can be moved in other directions.

Figure 5:
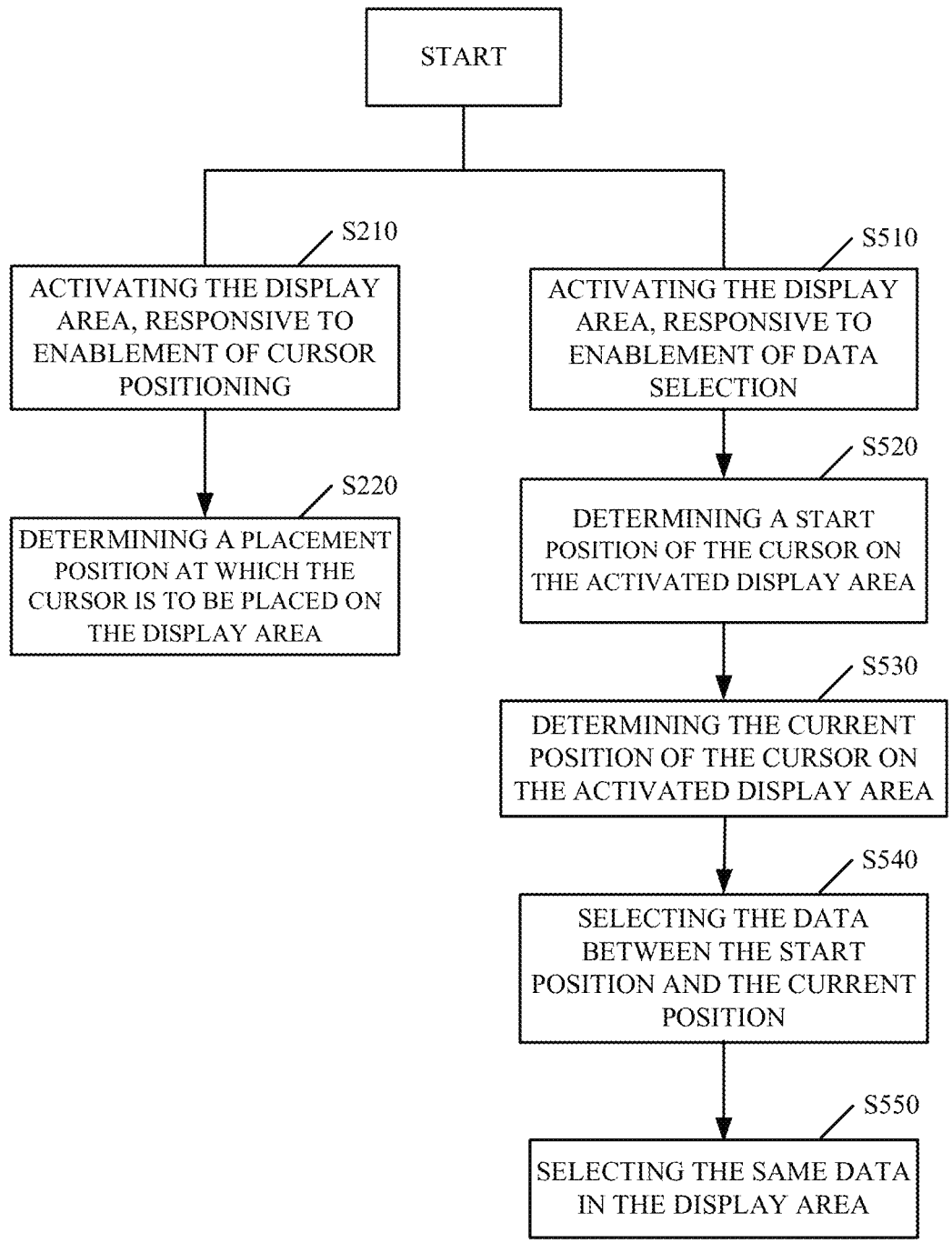
FIG. 5 is a schematic flowchart of the method for cursor positioning on a display screen according to another embodiment of the present invention.

FIG. 5 is a schematic flowchart of the method for cursor positioning on a display screen according to another embodiment of the present invention. The embodiment will be described in detail below in conjunction with the figures.

In this embodiment, a process of data selection is added. If the cursor positioning is enabled, steps S210 to S220 will be executed. If the data selection is enabled, steps S510 to S550 will be executed.

As shown in FIG. 5, at step S510, in response to enablement of the data selection, the original display area is activated to form the activated display area.

In this embodiment, the enablement of the data selection can be triggered by any predefined operation, such as a tactile operation. The tactile operation can be a predefined operation or gesture touching the display area.

The tactile operation for enabling the data selection can be an operation of touching the display area with multi-touch for a predetermined time period. The multi-touch means touching multiple points on the display area. For example, the tactile operation can be defined as touching the display area with at least two fingers simultaneously for a certain time period, or as touching the display area with one finger firstly and touching the display area with another finger while the first finger being still touching the display area, the touching with both two fingers being for a certain time period. In the latter case, upon it is detected that the user touches the display area with two fingers successively for the certain time period, the data selection is enabled and the display area enters a data selection mode.

The activated display area is the same as the original display area in terms of size and content, and can be moved under the control of the user. Generally, the activated display area can be moved in any direction. Note that, in case of the single-line text box, the activated display area can be moved only in a horizontal direction (i.e. left-right direction).

In an embodiment, firstly the floating display area the same as the original display area is generated as the activated display area. Then the floating display area is presented above the original display area. The floating display area can be presented, for example, with a different color, to distinguish from the original display area.

A person skilled in the art will appreciate that the display area can be activated in other ways, as long as the activated display area can be moved under the control of the user.

At step S520, a start position of the cursor on the activated display area is determined as a start point for the data to be selected. The start position is actually same as the position of the cursor on the original display area currently.

Next at step S530, the current position of the cursor on the activated display area is determined in response to the activated display area being moved. In this embodiment, the drag operation on the activated display area is received firstly. As described above, during the drag operation, the user touches any part of the activated display area and the activated display area then will be moved following the movement of the user's finger without moving the cursor. With the drag operation, the activated display area is moved relative to the cursor to cause the cursor's position on the activated display area to change. Upon the drag operation on the activated display area is stopped, the position of the cursor currently on the activated display area is determined as the current position. The current position will be a termination point for the data to be selected.

Further, the data near the cursor can be enlarged in the activated display area, in order for the user to precisely match the termination point for the data to be selected. The range for the enlargement can be predefined. With the movement of the activated display area, the enlarged data will change.

Then at step S540, the data between the start position determined in step S520 and the current position determined in step S530 is selected. Thus the data selection is implemented in the activated display area.

When the user's finger leaves from the activated display area, the movement of the activated display area is released. In response to the release, the activated display area is deactivated. That is, the activated display area is released. Then at step S550, the same data as the selected data at step S540 is selected in the original display area, and the data selection is implemented in the original display area.

It can be seen from the above description that the method of the embodiment can further determine the data to be selected precisely by moving the display area rather than the cursor, and can facilitate the user's operation and improve preciseness and efficiency of the data selection.

FIGS. 6A to 6D collectively include: touchscreen display 600; displayable content 602 (also sometimes herein referred to as "display area"); user gesture drag positions 606a, b, c; cursor 608; and dragging direction D3.

Figure 6B:
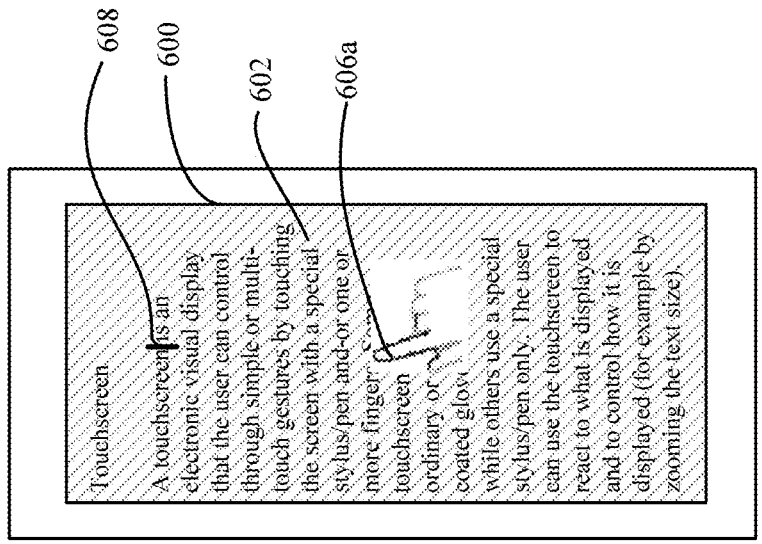
FIG. 6B is a view of a display screen at a second point in time, illustrating an example of the cursor positioning in which the method of FIG. 5 is implemented.
Figure 6A:
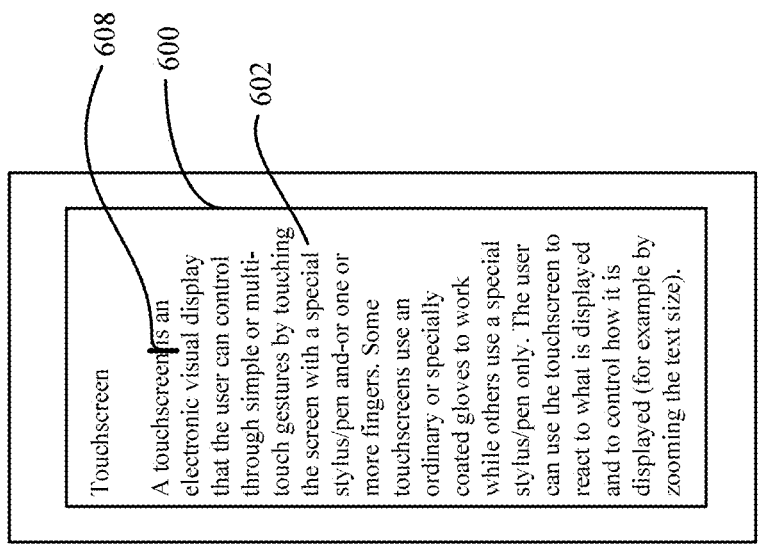
FIG. 6A is a view of a display screen at a first point in time, illustrating an example of the cursor positioning in which the method of FIG. 5 is implemented.

FIGS. 6A to 6D illustrate an example of the data selection in which the method shown in FIG. 5 is implemented. FIG. 6A shows the touchscreen display 600 before the data selection, FIG. 6B shows the touchscreen display after activating the display area, FIG. 6C shows the touchscreen display when moving the activated display area 602, and FIG. 6D shows the touchscreen display after the data selection.

As shown in FIG. 6A, the cursor's position on the original display area is after the word "touchscreen", which is the start point for the text to be selected. Upon the user performs the tactile operation for enabling data selection, the original display area is activated. In this example, the floating display area 602, the same as the original display area, is generated and presented above the original display area, as shown in FIG. 6B. In the floating display area 602, the letters "en", " i" near the cursor are enlarged. Then the user moves the floating display area towards the right in the horizontal direction D3 as shown in FIG. 6C (i.e. left-right direction). When the user stops moving the floating display area 602, the cursor's position on the floating display area is before the word "A", which is the termination point for the text to be selected. Thus the text "A touchscreen" is selected, as shown in FIG. 6C. When the user's finger leaves from the touchscreen display 600, the floating display area is released, and the same text "A touch screen" is selected in the original display area, as shown in FIG. 6D.

FIGS. 7A to 7D collectively include: touchscreen display 700; displayable content 702 (also sometimes herein referred to as "display area"); user gesture drag positions 706a, b, c; cursor 708; and dragging direction D4.

Figure 7B:
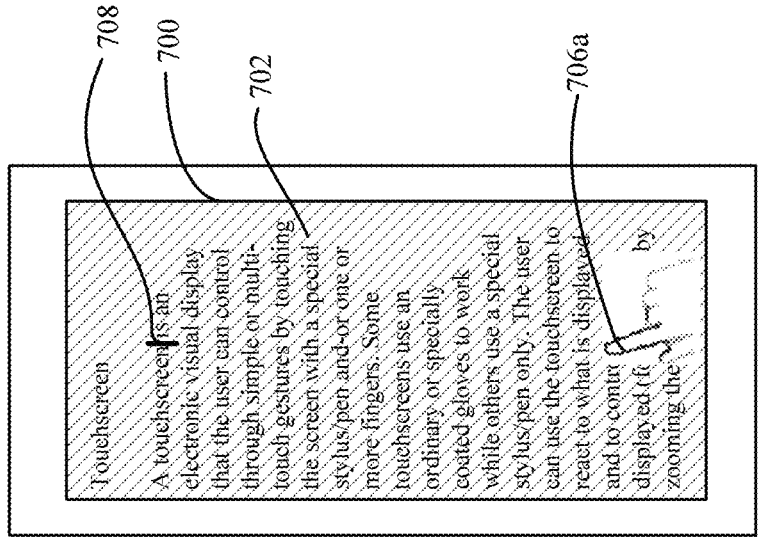
FIG. 7B is a view of a display screen at a second point in time, illustrating another example of the cursor positioning in which the method of FIG. 5 is implemented.
Figure 7A:
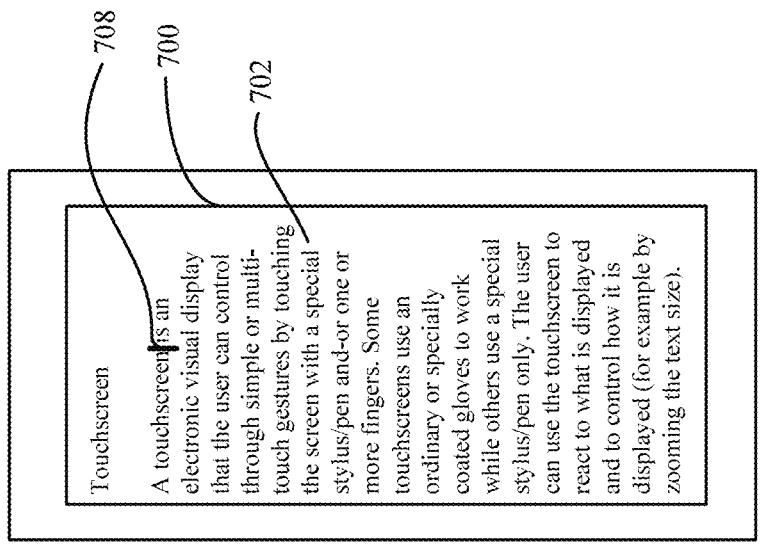
FIG. 7A is a view of a display screen at a first point in time, illustrating another example of the cursor positioning in which the method of FIG. 5 is implemented.
Figure 7D:
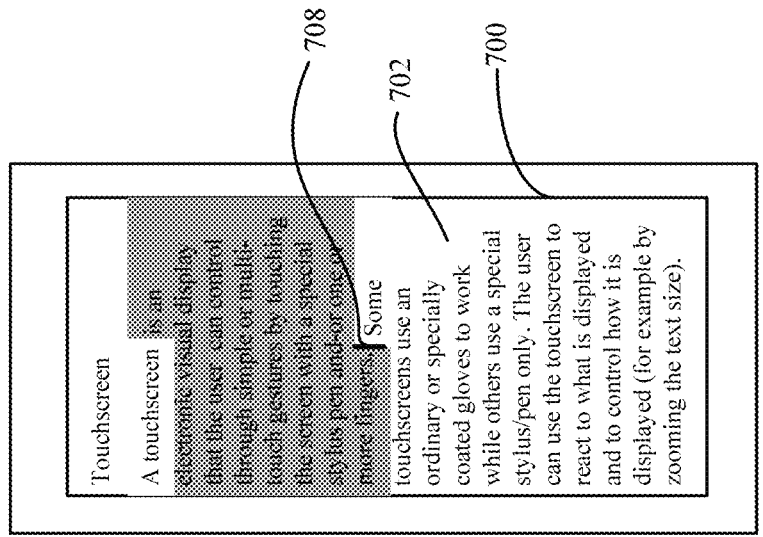
FIG. 7D is a view of a display screen at a fourth point in time, illustrating another example of the cursor positioning in which the method of FIG. 5 is implemented.
Figure 7C:
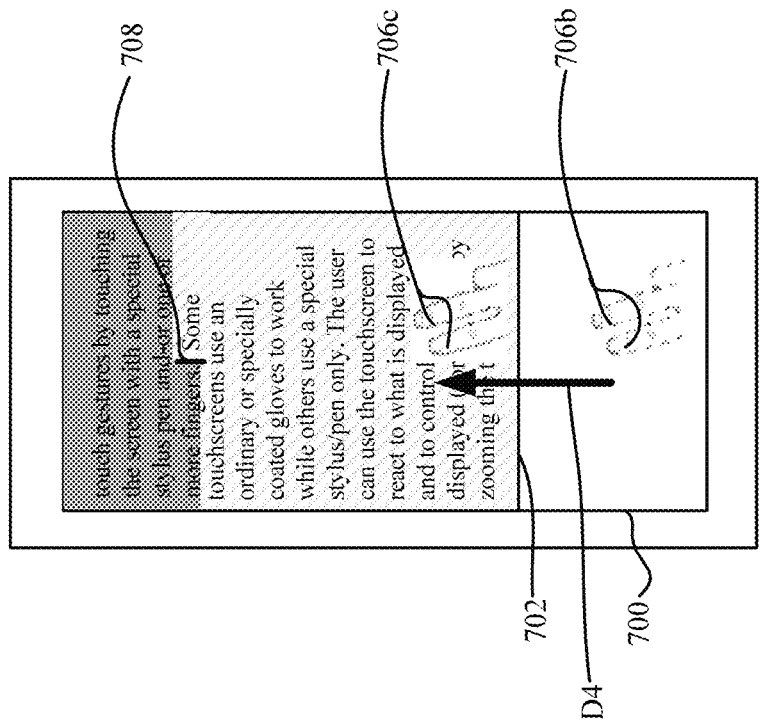
FIG. 7C is a view of a display screen at a third point in time, illustrating another example of the cursor positioning in which the method of FIG. 5 is implemented.

FIGS. 7A to 7D illustrate another example of the data selection in which the method shown in FIG. 5 is implemented. In this example, FIGS. 7A and 7B are similar to FIGS. 6A and 6B. In FIG. 7C, the user moves the floating display area 702 with his/her finger upwards in the vertical direction D4 of FIG. 7C, and stops moving when the cursor's position is before the word "Some" in the floating display area. Thus the text between the words "touchscreen" and "Some" is selected. When the user's finger leaves from the touchscreen display 700, the floating display area is released, and the same text is selected in the original display area, as shown in FIG. 7D.

For the purpose of illustration, in FIGS. 6C, 6D, 7C, and 7D, the selected text is shadowed with dark color.

Although the examples in which the floating display area is moved in the vertical direction and in the horizontal direction respectively as described above, a person skilled in the art will appreciate that the floating display area can be moved in other directions.

Under the same inventive concept, another embodiment of the invention can provide an apparatus for cursor positioning on a display screen. The apparatus can comprise one or more processors, a memory coupled to at least one of the processors, and a set of computer program instructions stored in the memory and executed by at least one of the processors. The set of computer program instructions when executed perform the actions of, responsive to enablement of cursor positioning, activating a display area on the display screen and determining a placement position at which a cursor is to be placed on the display area based on a desired position to which the activated display area is moved while the cursor remains static on the display screen.

In an embodiment, the set of computer program instructions when executed perform the actions of generating a floating display area the same as the display area and presenting the floating display area above the display area.

In an embodiment, the set of computer program instructions when executed performs the actions of receiving a drag operation on the activated display area, determining a temporary position of the cursor on the activated display area in response to the drag operation of the activated display area being stopped, and determining the placement position on the display area corresponding to the determined temporary position.

In an embodiment, the set of computer program instructions when executed performs the actions of receiving a drag operation on the activated display area, determining a move direction and a move distance of the activated display area in response to the drag operation of the activated display area being stopped, and determining the placement position after the cursor on the display area is moved from an initial position by the move distance in the direction opposite to the move direction.

In an embodiment, the set of computer program instructions when executed performs the actions of, responsive to enablement of data selection, activating the display area, determining a start position of the cursor on the activated display area, determining a current position of the cursor on the activated display area in response to the activated display area being moved, selecting data between the start position and the current position, and selecting data the same as the selected data in the display area.

In an embodiment, the set of computer program instructions when executed performs the actions of receiving a drag operation on the activated display area and determining the current position of the cursor on the activated display area in response to the drag operation of the activated display area being stopped.

In an embodiment, the set of computer program instructions when executed performs the actions of enlarging data near the cursor in the activated display area.

Under the same inventive concept, another embodiment of the invention can provide a computer program product for cursor positioning on a display screen. The computer program product comprises a computer readable storage medium having program instructions embodied therewith. The program instructions executable by a processor cause the processor to, responsive to enablement of cursor positioning, activate a display area on the display screen and determine a placement position at which a cursor is to be placed on the display area based on a desired position to which the activated display area is moved while the cursor remains static on the display screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    displaying a first display on a touchscreen display device, with the first display including: (i) a text box occupying an initial text box position with respect to the touchscreen display, and (ii) a cursor occupying an initial cursor position with respect to the touchscreen display;
    receiving first user input data indicating that a user has touched the display of the text box on the touchscreen for at least a predetermined amount of time;
    responsive to receipt of the first user input data, displaying a series of second displays where the text box is floating relative to the touchscreen and the cursor remains in a constant position with respect to the touchscreen;
    during the displaying of the series of second displays where the text box is floating, receiving second user input indicative of a dragging gesture on the touchscreen by the user;
    responsive to the receipt of the second user input, dragging the floating text box relative to the touchscreen in accordance with the dragging gesture while the cursor remains in the initial cursor position; and
    after completion of the dragging gesture of the second user input, displaying a third display on the touchscreen display device, with the third display including: (i) the text box occupying the initial text box position with respect to the touchscreen display, and (ii) the cursor at a changed position that is spaced apart from the initial cursor position;
    wherein content of the text box of the first display, the series of second displays, and the third display is the same size, and the displayable area of the text box of the first display, the series of second displays, and the third display is the same size.

2. The method of claim 1, wherein after completion of the dragging gesture of the second user input, text information between the initial cursor position and the cursor at the changed position is selected.

3. The method of claim 1, wherein the touchscreen display device is a smart phone.

4. The method of claim 1, wherein the predetermined amount of time is 3 seconds.

5. A computer program product comprising:
    a computer-readable storage medium; and
    computer code stored on the computer-readable storage medium, with the computer code including instructions for causing a processor(s) set to perform operations including the following:
        displaying a first display on a touchscreen display device, with the first display including: (i) a text box occupying an initial text box position with respect to the touchscreen display, and (ii) a cursor occupying an initial cursor position with respect to the touchscreen display;

receiving first user input data indicating that a user has touched the display of the text box on the touchscreen for at least a predetermined amount of time;

responsive to receipt of the first user input data, displaying a series of second displays where the text box is floating relative to the touchscreen and the cursor remains in a constant position with respect to the touchscreen;

during the displaying of the series of second displays where the text box is floating, receiving second user input indicative of a dragging gesture on the touchscreen by the user;

responsive to the receipt of the second user input, dragging the floating text box relative to the touchscreen in accordance with the dragging gesture while the cursor remains in the initial cursor position; and after completion of the dragging gesture of the second user input, displaying a third display on the touchscreen display device, with the third display including: (i) the text box occupying the initial text box position with respect to the touchscreen display, and (ii) the cursor at a changed position that is spaced apart from the initial cursor position;

wherein content of the text box of the first display, the series of second displays, and the third display is the same size, and the displayable area of the text box of the first display, the series of second displays, and the third display is the same size.

6. The product of claim 5, wherein after completion of the dragging gesture of the second user input, text information between the initial cursor position and the cursor at the changed position is selected.

7. The product of claim 5, wherein the touchscreen display device is a smart phone.

8. The product of claim 5, wherein the predetermined amount of time is 3 seconds.

9. A computer system comprising:
a processor(s) set;
a computer-readable storage medium; and
computer code stored on the computer-readable storage medium, with the computer code including instructions for causing the processor(s) set to perform operations including the following:

displaying a first display on a touchscreen display device, with the first display including: (i) a text box occupying an initial text box position with respect to the touchscreen display, and (ii) a cursor occupying an initial cursor position with respect to the touchscreen display;

receiving first user input data indicating that a user has touched the display of the text box on the touchscreen for at least a predetermined amount of time;

responsive to receipt of the first user input data, displaying a series of second displays where the text box is floating relative to the touchscreen and the cursor remains in a constant position with respect to the touchscreen;

during the displaying of the series of second displays where the text box is floating, receiving second user input indicative of a dragging gesture on the touchscreen by the user;

responsive to the receipt of the second user input, dragging the floating text box relative to the touchscreen in accordance with the dragging gesture while the cursor remains in the initial cursor position; and after completion of the dragging gesture of the second user input, displaying a third display on the touchscreen display device, with the third display including: (i) the text box occupying the initial text box position with respect to the touchscreen display, and (ii) the cursor at a changed position that is spaced apart from the initial cursor position;

wherein content of the text box of the first display, the series of second displays, and the third display is the same size, and the displayable area of the text box of the first display, the series of second displays, and the third display is the same size.

10. The system of claim 9, wherein after completion of the dragging gesture of the second user input, text information between the initial cursor position and the cursor at the changed position is selected.

11. The system of claim 9, wherein the touchscreen display device is a smart phone.

12. The system of claim 9, wherein the predetermined amount of time is 3 seconds.

* * * * *